United States Patent
Adkisson

(10) Patent No.: US 7,275,191 B2
(45) Date of Patent: Sep. 25, 2007

(54) COVERAGE DECODER CIRCUIT FOR PERFORMANCE COUNTER

(75) Inventor: Richard W. Adkisson, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 877 days.

(21) Appl. No.: 10/635,372

(22) Filed: Aug. 6, 2003

(65) Prior Publication Data

US 2004/0236995 A1 Nov. 25, 2004

Related U.S. Application Data

(60) Provisional application No. 60/469,180, filed on May 9, 2003.

(51) Int. Cl.
*G01R 31/28* (2006.01)
*G06F 11/00* (2006.01)
(52) U.S. Cl. ........................... 714/724; 714/47
(58) Field of Classification Search ................ 714/724, 714/733
See application file for complete search history.

(56) References Cited

U.S. PATENT DOCUMENTS

| | | | |
|---|---|---|---|
| 5,651,112 A | 7/1997 | Matsuno et al. | |
| 5,796,633 A | 8/1998 | Burgess et al. | |
| 5,835,702 A | 11/1998 | Levine et al. | |
| 5,881,223 A | 3/1999 | Agrawal et al. | |
| 5,925,144 A * | 7/1999 | Sebaa | 714/733 |
| 6,112,317 A | 8/2000 | Berc et al. | |
| 6,112,318 A | 8/2000 | Jouppi et al. | |
| 6,275,782 B1 * | 8/2001 | Mann | 702/182 |
| 6,311,303 B1 * | 10/2001 | Gates et al. | 714/734 |
| 6,360,337 B1 | 3/2002 | Zak et al. | |
| 6,546,359 B1 | 4/2003 | Week | |
| 6,625,684 B1 * | 9/2003 | Casey et al. | 710/316 |
| 6,816,989 B2 * | 11/2004 | Litt | 714/724 |
| 6,957,371 B2 * | 10/2005 | Ricchetti et al. | 714/733 |
| 2002/0194543 A1 * | 12/2002 | Veenstra et al. | 714/39 |

* cited by examiner

*Primary Examiner*—James C Kerveros

(57) ABSTRACT

Circuitry for use with a general purpose performance counter ("GPPC") connected to a bus carrying a plurality of encoded state coverage signals indicative of test coverage in a logic design, wherein the circuitry is operable to decode and capture the encoded coverage information. A selection circuit associated with the GPPC is operable to select the encoded state coverage signals from a multi-bit event signal on the bus. A line decoder coupled to the selection circuit decodes the encoded state coverage signals into N one-hot signals, which are asserted based on coverage of corresponding states during test. A capture circuit is operable to capture the N one-hot signals for further processing.

23 Claims, 7 Drawing Sheets

COVERAGE DECODER CIRCUIT FOR PERFORMANCE COUNTER

PRIORITY UNDER 35 U.S.C. §119(e) & 37 C.F.R. §1.78

This nonprovisional application claims priority based upon the following prior United States provisional patent application entitled: "General Purpose Counters for Performance, Debug and Coverage," Application No. 60/469,180, filed May 9, 2003, in the name(s) of Richard W. Adkisson and Tyler J. Johnson, which is hereby incorporated by reference.

CROSS-REFERENCE TO RELATED APPLICATIONS

This application is related to U.S. patent application Ser. No. 10/635,083, filed Aug. 6, 2003, entitled GENERAL PURPOSE PERFORMANCE COUNTER; U.S. patent application Ser. No. 10/635,369, filed Aug. 6, 2003, entitled INCREMENT/DECREMENT CIRCUIT FOR PERFORMANCE COUNTER; U.S. patent application Ser. No. 10/635,371, filed Aug. 6, 2003 entitled COVERAGE CIRCUIT FOR PERFORMANCE COUNTER; U.S. patent application Ser. No. 10/635,103, filed Aug. 6, 2003, entitled DATA SELECTION CIRCUIT FOR PERFORMANCE COUNTER; U.S. patent application Ser. No. 10/635,079, filed Aug. 6, 2003, entitled ZEROING CIRCUIT FOR PERFORMANCE COUNTER; and U.S. patent application Ser. No. 10/635,373, filed Aug. 6, 2003, entitled MATCH CIRCUIT FOR PERFORMANCE COUNTER, all of which are hereby incorporated by reference in their entirety.

Related subject matter disclosed in the following commonly owned co-pending U.S. patent applications: (i) application Ser. No. 10/402,092, filed Mar. 28, 2003, U.S. Pat. No. 7,146,538, entitled A BUS INTERFACE MODULE; and (ii) application Ser. No. 10/402,034, filed Mar. 28, 2003, U.S. Pat. No. 7,188,277, entitled AN INTEGRATED CIRCUIT, is hereby incorporated by reference.

BACKGROUND

Increasing demand for computer system scalability (i.e., consistent price and performance and higher processor counts) combined with increases in performance of individual components continues to drive systems manufacturers to optimize core system architectures. One such systems manufacturer has introduced a server system that meets these demands for scalability with a family of application specific integrated circuits ("ASICs") that provide scalability to tens or hundreds of processors, while maintaining a high degree of performance, reliability, and efficiency. The key ASIC in this system architecture is a cell controller ("CC"), which is a processor-I/O-memory interconnect and is responsible for communications and data transfers, cache coherency, and for providing an interface to other hierarchies of the memory subsystem.

In general, the CC comprises several major functional units, including one or more processor interfaces, memory units, I/O controllers, and external crossbar interfaces all interconnected via a central data path ("CDP"). Internal signals from these units are collected on a performance monitor bus ("PMB"). One or more specialized performance counters, or performance monitors, are connected to the PMB and are useful in collecting data from the PMB for use in debugging and assessing the performance of the system of which the CC is a part. Currently, each of the performance counters is capable of collecting data from only one preselected portion of the PMB, such that the combination of all of the performance counters together can collect all of the data on the PMB. While this arrangement is useful in some situations, there are many situations in which it would be advantageous for more than one of the performance counters to access data from the same portion of the PMB. Additionally, it would be advantageous to be able to use the performance counters in the area of determining test coverage. These applications are not supported by the state-of-the-art performance counters.

SUMMARY

In one embodiment, the invention is directed to circuitry for use with a general purpose performance counter ("GPPC") connected to a bus carrying a plurality of encoded state coverage signals indicative of test coverage in a logic design, wherein the circuitry is operable to decode and capture the encoded coverage information. A selection circuit associated with the GPPC is operable to select the encoded state coverage signals from a multi-bit event signal on the bus. A line decoder coupled to the selection circuit decodes the encoded state coverage signals into N one-hot signals, which are asserted based on coverage of corresponding states during test. A capture circuit is operable to capture the N one-hot signals for further processing.

DETAILED DESCRIPTION OF THE DRAWINGS

Figure 1:
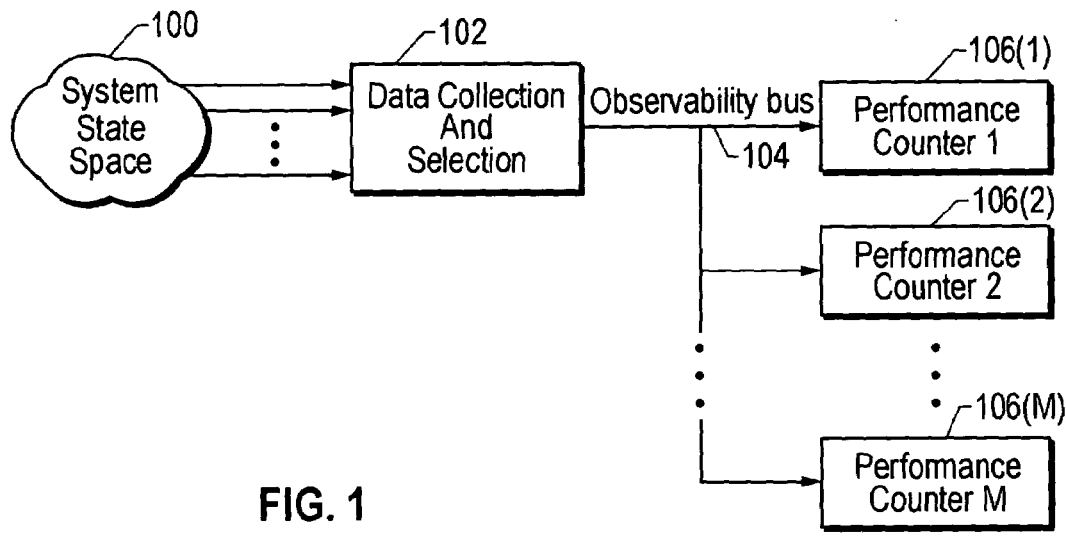
FIG. 1 is a block diagram illustrating general purpose data collection in a logic design.

In the drawings, like or similar elements are designated with identical reference numerals throughout the several views thereof, and the various elements depicted are not necessarily drawn to scale.

FIG. 1 is a block diagram of general purpose data collection in a logic design which may comprise any electronic integrated circuit having known or heretofore unknown functionality. As shown in FIG. 1, the state space 100 of a logic design under consideration is driven to data collection and selection logic 102. The logic 102 drives a D-bit data collection, or observability bus 104, carrying a D-bit debug_bus signal to a plurality of general purpose performance counters ("GPPC") 106(1)-106(M). Details of one embodiment of the logic 102 and bus 104 are provided in U.S. patent application Ser. No. 10/402,092; filed Mar. 28, 2003, entitled A BUS INTERFACE MODULE (Docket No. 200208674-1); and U.S. patent application Ser. No. 10/402,034; filed Mar. 28, 2003, entitled AN INTEGRATED CIRCUIT (Docket No. 200209004-1), each of which is hereby incorporated by reference in its entirety.

In one embodiment, D is equal to 80, M is equal to 12, and performance counters 106(1)-106(M-1) are general purpose performance counters, while the remaining performance counter 106(M) increments on every clock cycle. As will be illustrated below, the general purpose performance counters are "general purpose" in that each of them is capable of accessing any bit of the 80-bits on the bus 104; moreover, all of them may access the same block of bits and do the same or different performance calculations thereon.

Figure 2:
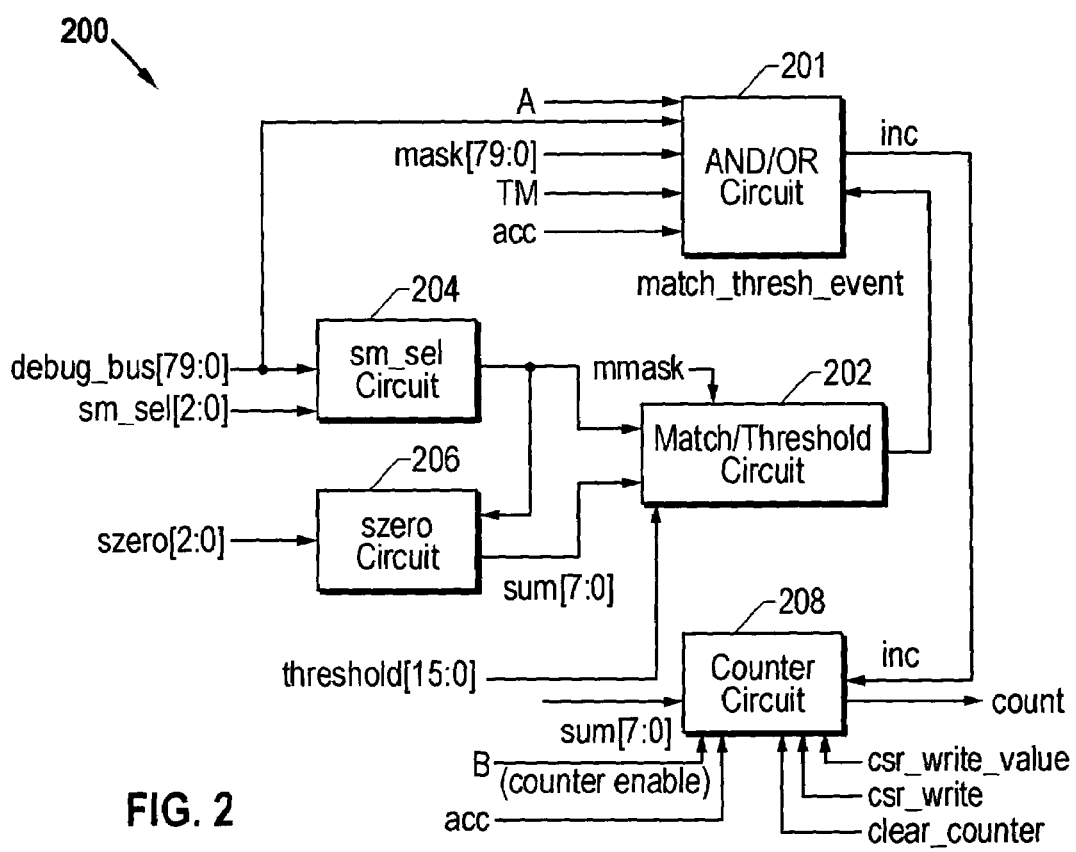
FIG. 2 is a block diagram of a general purpose performance counter ("GPPC") according to one embodiment.

FIG. 2 is a block diagram of a general purpose performance counter 200, which is identical in all respects to each of the performance counters 106(1)-106(M-1) (FIG. 1), in accordance with one embodiment. As will be described in greater detail below, the performance counter 200 can be used to perform general purpose operations to extract performance, debug, or coverage information with respect to any system under test (SUT) such as, for instance, the system state space 100 shown in FIG. 1. The performance counter 200 includes an AND/OR circuit 201, a match/threshold circuit 202, an sm_sel circuit 204, an szero circuit 206, and a counter circuit 208.

Figure 3:
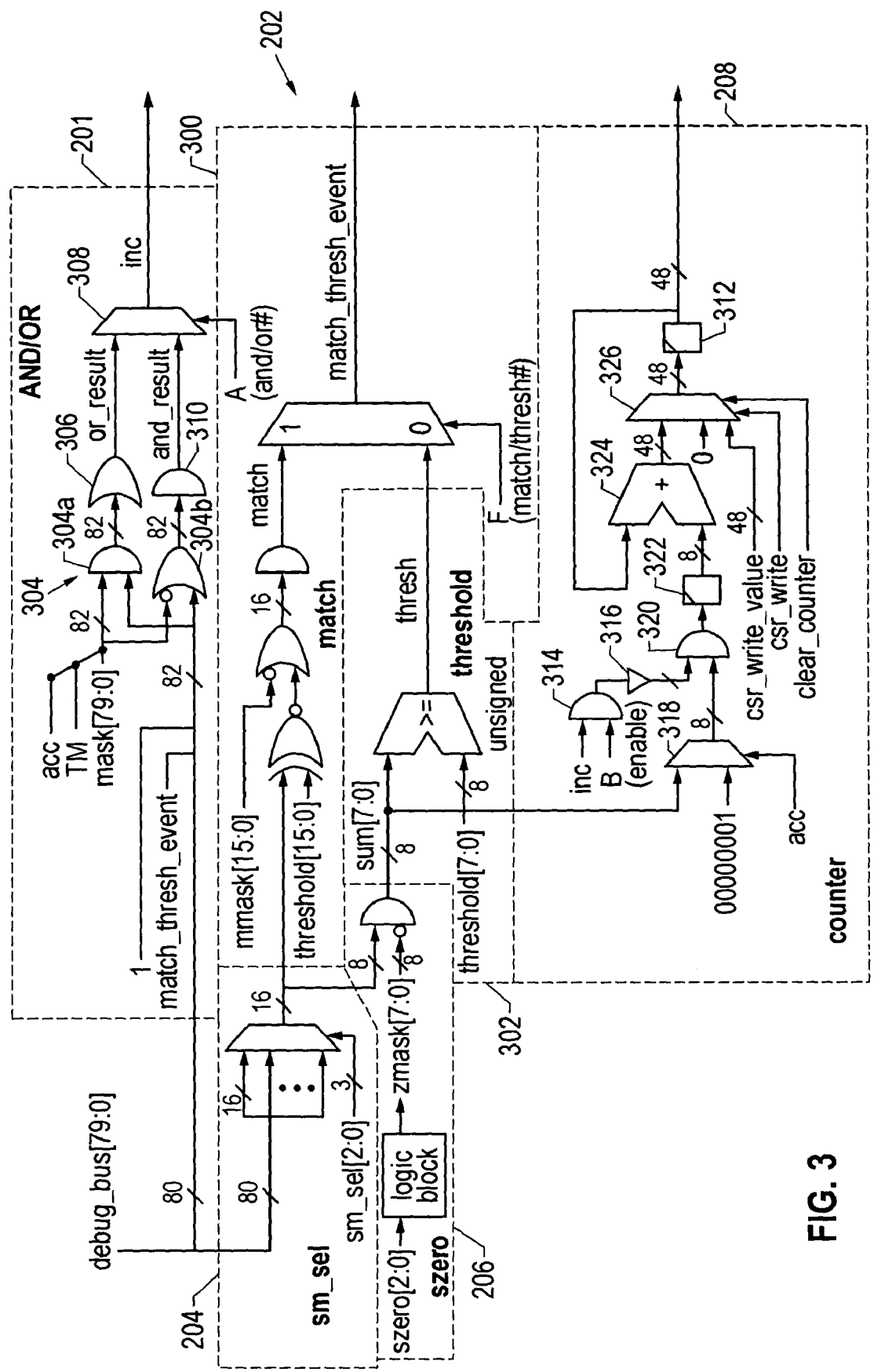
FIG. 3 is a more detailed block diagram of the general purpose performance counter of FIG. 2.

In general, the AND/OR circuit 201 enables access to all of the bits of the debug_bus signal coming into the performance counter 200 via the observability bus 104. In one embodiment, as illustrated in FIGS. 2 and 3, debug_bus is an 80-bit signal. When the AND/OR circuit 201 is operating in AND mode, the circuit activates an "inc" signal to the counter circuit 208 if all of the bits of the debug_bus signal plus two bits that are appended thereto, as will be described in greater detail below, that are of interest (as indicated by the value of an 80-bit "mask" plus two bits that are appended thereto) are set. When the AND/OR circuit 201 is operating in OR mode, the circuit activates the inc signal to the counter circuit 208 if any one or more of the bits of the debug_bus signal plus the two additional bits that are of interest (as indicated by the value the mask plus the two additional bits) are set.

When the match/threshold circuit 202 is operating in "match" mode, a match portion 300 (FIG. 3) of the circuit activates a match_thresh_event signal to the AND/OR circuit 201 when an N-bit portion of the debug_bus signal selected as described in greater detail below with reference to the sm_sel circuit 204 and the szero circuit 206 matches an N-bit threshold for all bits selected by a match mask ("mmask"). In particular, for all bits of the selected N-bit debug bus signal portion that are "don't cares", the corresponding bit of mmask will be set to 0; conversely, for all bits of the selected N-bit debug bus signal portion that are not "don't cares", the corresponding bit of mmask will be set to 1. The match_thresh_event signal is one of the two bits appended to the debug_bus signal. In the illustrated embodiment, N is equal to 16.

When the match/threshold circuit 202 is operating in "threshold" mode, a threshold portion 302 (FIG. 3) of the circuit 202 activates the match_thresh_event signal to the AND/OR circuit 201 when an S-bit portion of the debug_bus signal selected and zeroed as described in greater detail below with reference to the sm_sel circuit 204 and the szero circuit 206 is equal to or greater than the threshold. In the illustrated embodiment, S is equal to N/2, or 8.

Additional details regarding operation of the match/threshold circuit 202 are provided in U.S. patent application Ser. No. _____, filed _____ entitled MATCH CIRCUIT FOR PERFORMANCE COUNTER (Docket No. 200209002-1).

The sm_sel circuit 204 selects an N-bit portion of the debug_bus signal aligned on a selected 10-bit block boundary into both the match portion 300 and the threshold portion 302 (FIG. 3) of the match/threshold circuit 202 and to a sum input of the counter circuit 208. As previously stated, in the illustrated embodiment, N is equal to 16. The szero circuit 206 zeroes out none or all but one of S bits aligned on a selected 10-bit block boundary into the threshold portion 302 of the match/threshold circuit 202 and the sum input of the counter circuit 208. In the illustrated embodiment, S is equal to eight. The selected 10-bit block boundary is identified by the value of a three-bit control signal sm_sel input to the sm_sel circuit 204. As will be seen below, the sm_sel circuit 204 and szero circuit 206 can operate together as a selection circuit for selecting a particular piece of the D-bit debug_bus which may be encoded with state coverage information that is generated by the logic design's state space under test.

Additional details regarding the operation of the sm_sel circuit 204 and the szero circuit 206 are provided in U.S. patent application Ser. No. _____, filed _____ entitled DATA SELECTION CIRCUIT FOR PERFORMANCE COUNTER (Docket No. 200209000-1) and U.S. patent application Ser. No. _____, filed _____ entitled ZEROING CIRCUIT FOR PERFORMANCE COUNTER (Docket No. 200209001-1).

In one embodiment, each general purpose performance counter, such as the performance counter 200, is 48 bits plus overflow. The performance counter 200 is general purpose in that it looks at all D bits of the debug_bus signal for an event mask plus two extra events, eight separate selections of 16 bits for the match compare operation and eight separate selections of eight bits for the threshold compare and the accumulate operations. The eight bits for the threshold compare and the accumulate operations are the bottom eight bits of the 16 bits selected for the match compare operation. Those 16 bits are aligned to 10 slot boundaries as shown in an exemplary mapping arrangement illustrated in FIG. 4.

Figure 4:
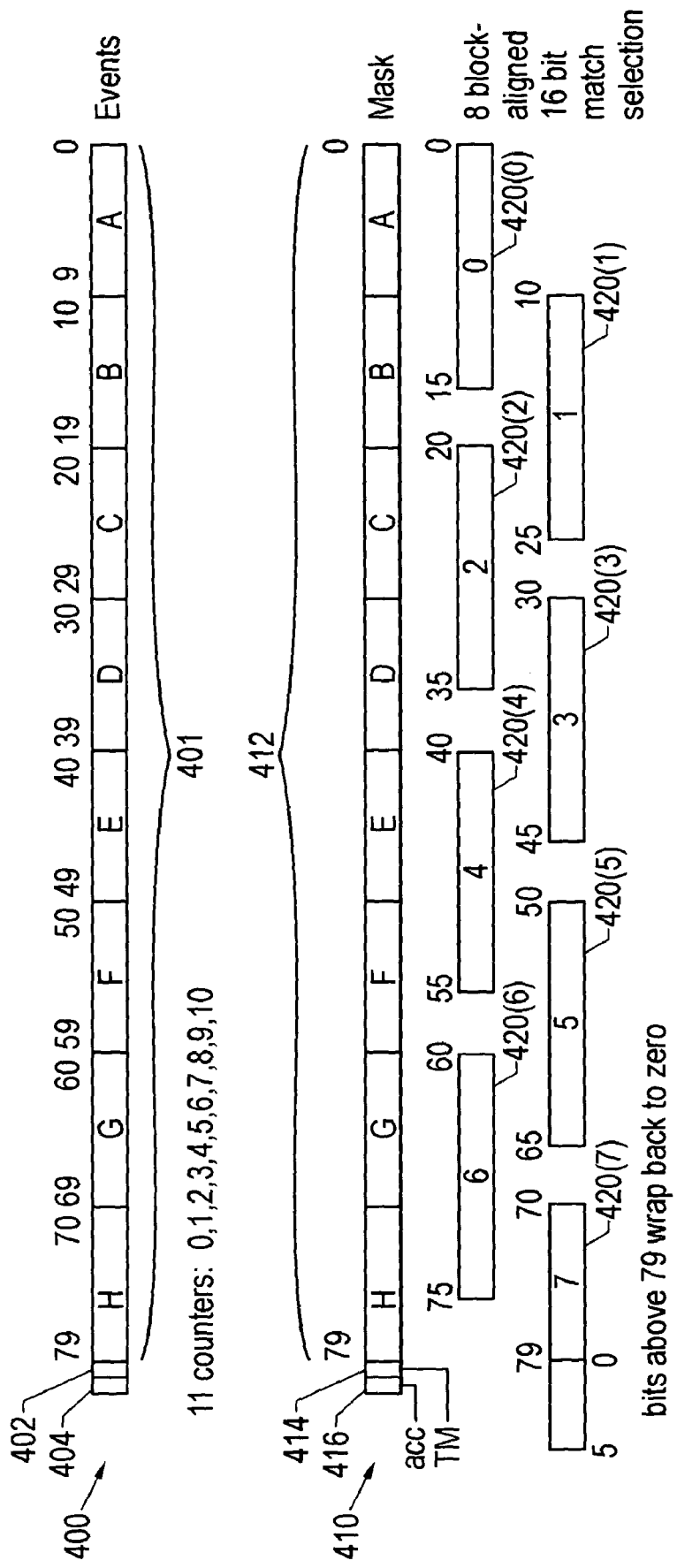
FIG. 4 illustrates a method in which signals are mapped from an observabilty bus to a performance counter in accordance with one embodiment.

In FIG. 4, an events signal 400 comprises the debug_bus signal, designated in FIG. 4 by reference numeral 401, the match_threshold_event signal, designated by reference numeral 402 and a logic 1 bit, designated by reference numeral 404. The debug_bus signal 401 comprises bits [79:0] of the events signal 400; the match_threshold_event signal 402 comprises bit [80] of the events signal, and the logic 1 bit 404 comprises bit [81] of the events signal. As will be explained in detail hereinbelow, at least a portion of the debug_bus signal 401 may be also encoded with a plurality of state coverage signals indicative of test coverage with respect to a SUT, which coverage signals may be efficiently decoded and captured by circuitry associated with a GPPC.

As best illustrated in FIG. 3, the events signal 400 (i.e., the debug_bus signal with the match_threshold_event signal and the logic 1 appended thereto) are input to a first logic stage 304 of the AND/OR circuit 201 for purposes that will be described in greater detail below.

Referring again to FIG. 4, a composite mask signal 410 comprises an 80-bit mask signal, designated by a reference numeral 412, a match_threshold_event mask ("TM") bit, designated by reference numeral 414, and an accumulate bit ("acc"), designated by reference numeral 416. The mask signal 412 comprises bits [79:0] of the composite mask signal 410; the TM bit 414 comprises bit [80] of the composite mask signal, and the acc bit 416 comprises bit [81] of the composite mask signal. As best illustrated in FIG. 3, each bit of the composite mask 410 (i.e., the mask signal with the TM and acc bits appended thereto) is input to the first logic stage 304 of the AND/OR circuit 201 for purposes that will be described in greater detail below.

Continuing to refer to FIG. 4, eight 10-bit-block-aligned 16-bit match selections are respectively designated by reference numerals 420(0)-420(7). In particular, the selection 420(0) comprises bits [0:15]; the selection 420(1) comprises bits [10:25]; the selection 420(2) comprises bits [20:35]; the selection 420(3) comprises bits [30:45]; the selection 420(4) comprises bits [40:55]; the selection 420(5) comprises bits [50:65]; the selection 420(6) comprises bits [60:75]; and the selection 420(7) comprises bits [70:5] (bits above 79 wrap back to zero.

Referring again to FIG. 3, the first logic stage 304 comprises an AND portion, represented by an AND gate 304a, for bit-wise ANDing the events signal 400 with the composite mask signal 410, and an OR portion, represented by an OR gate 304b, for bit-wise ORing the inverse of the composite mask signal 410 with the events signal 400. It will be recognized that, although represented in FIG. 3 as a single two-input AND gate 304a, the AND portion of the first logic stage 304 actually comprises 82 two-input AND gates. Similarly, the OR portion of the first logic stage 304 comprises 82 two-input OR gates identical to the OR gate 304b.

The outputs of the AND portion of the first logic stage 304 are input to an 82-input OR gate 306, the output of which is input to one input of a two-input MUX 308 as an "or_result". Similarly, the outputs of the OR portion of the first logic stage 304 are input to an 82-input AND gate 310, the output of which is input to the other input of the MUX 308 as an "and_result". A control signal ("and/or#") from a control status register (CSR) (not shown) controls whether the AND/OR circuit 201 functions in AND mode, in which case the and_result is output from the MUX 308 as the inc signal, or in OR mode, in which case the or_result is output from the MUX as the inc signal.

As a result, when the AND/OR circuit 201 is operating in the AND mode, the inc signal comprises the and_result signal and will be activated when all of the bits of the events signal 400 that are of interest as specified by the composite mask 410 are set. When the AND/OR circuit 201 is operating in OR mode, the inc signal comprises the or_result signal and will be activated when any one of the bits of the events signal 400 that are of interest as specified by the composite mask 410 is set.

The acc bit 416 of the composite mask 410 is CSR-settable. Setting the TM bit 414 in the composite mask 410 designates the match_thresh_event signal in the events signal as a bit of interest; not setting the TM bit in the composite mask will cause the value of the match_thresh_event signal in the events signal 400, and hence the result of any match or threshold operation performed by the match/threshold circuit 202, to be ignored.

Continuing to refer to FIG. 3, the operation of an embodiment of the counter circuit 208 will be described in greater detail. The counter circuit 208 is an X bit counter that can hold, increment by one, add S bits, clear, or load a value into a count value register 312. Other processing may also occur in order to read the value of the register 312. In the embodiment illustrated in FIG. 3, X is equal to 48. Counter circuit 208 operation is enabled by setting an counter enable signal B, which comprises one input of a two-input AND gate 314. The other input of the AND gate 314 is connected to receive the inc signal from the AND/OR circuit 201. Accordingly, when the counter circuit 208 is enabled and the inc signal is activated, a logic one is output from the AND gate 314. In any other case, the output of the AND gate 314 will be a logic zero. The output of the AND gate 314 is replicated by an 8x replicator 316 and the resulting 8-bit signal is bit-wise ANDed with an 8-bit signal output from a MUX circuit 318. The inputs to the MUX circuit 318 are the sum[7:0] signal output from the szero circuit 206 and an 8-bit signal the value of which is [00000001]. The sum[7:0] signal will be output from the MUX circuit 318 when the acc signal is activated; otherwise, the [00000001] signal will be output from the MUX circuit.

An AND circuit, represented by an AND gate 320, bit-wise ANDs the signals output from the replicator 316 and from the MUX circuit 318. The resulting 8-bit signal is input to a register 322. An adder 324 adds the 8-bit signal stored in the register 322 to the 48-bit sum stored in the count value register 312. The new sum output from the adder 324 is input to a MUX circuit 326. Two other sets of inputs to the MUX circuit 326 are connected to a logic zero and a csr_write_value, respectively. When a csr_write enable signal to the MUX circuit 326 is activated, the value of csr_write_value is output from the MUX circuit 326 and written to the count value register 312. In this manner, a value can be loaded into the count value register 312. Similarly, when the clear_counter signal is asserted, 48 zero bits are output from the MUX circuit 326 to the count value register 312, thereby clearing the register.

If neither the csr_write signal nor the clear_counter signal is asserted and the acc signal is asserted, the output of the adder 324 is written to the count value register 312, thereby effectively adding S bits (i.e., the value of the sum[7:0] signal) to the previous value of the count value register 312. Not enabling the counter circuit 208 results in the count value register 312 being held at its current value. Finally, to increment the value of the count value register 312 by one, the counter circuit 208 must be enabled, the inc signal must be asserted, and the acc signal must not be asserted.

As described in detail above, FIG. 4 illustrates that the entire data collection bus 104 (FIG. 1) is available for all of the performance counters, each being represented by the performance counter 200, making them general purpose. All D bits of the debug_bus signal can be used by the AND/OR circuit 201. N bits aligned on block boundaries can be selected by the sm_sel circuit 206, enabling full coverage of the observabilty bus 104.

Figure 5A:
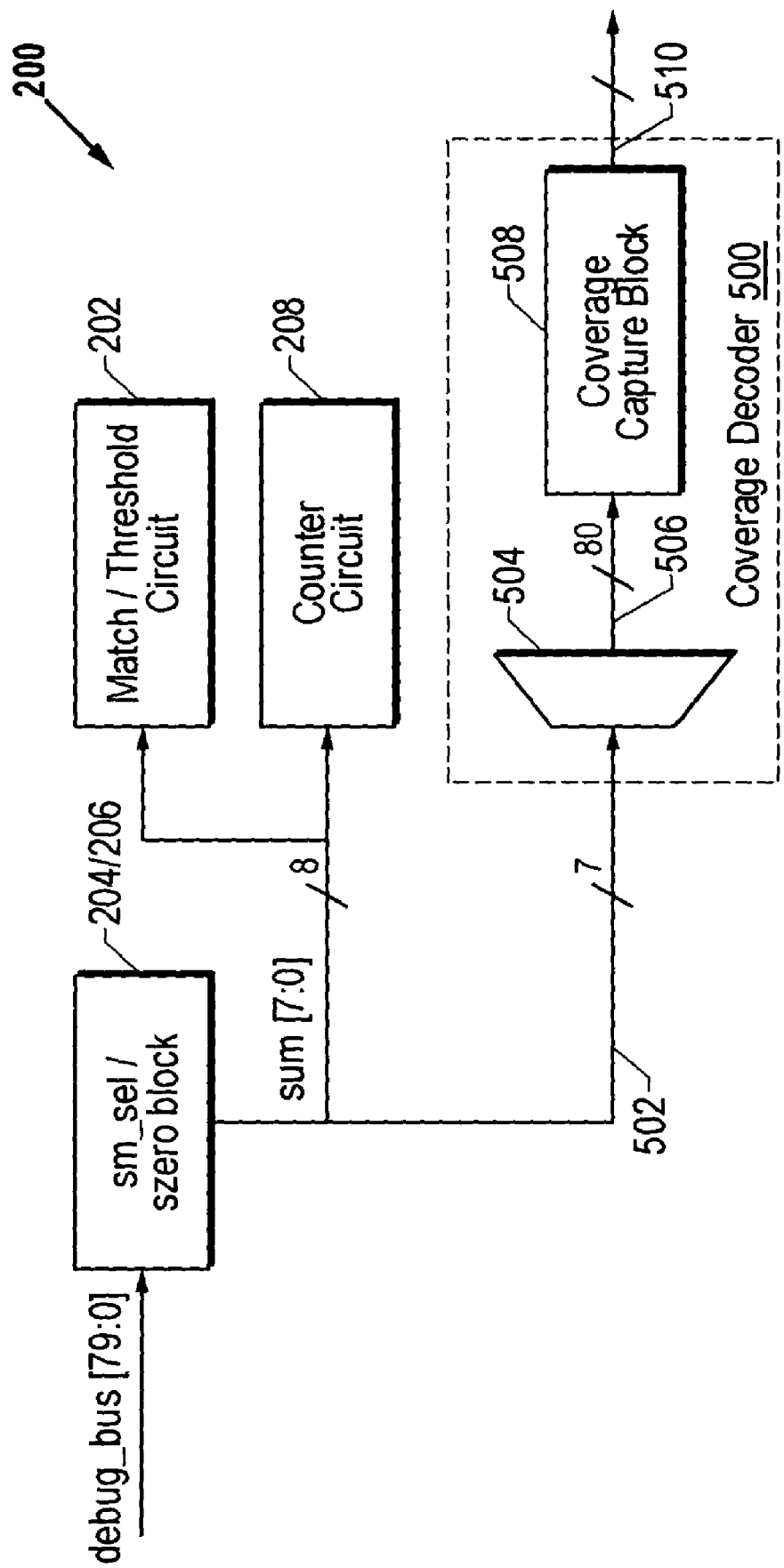
FIG. 5A depicts a block diagram of a coverage decode/capture circuit associated with a GPPC for decoding and capturing state coverage signals encoded in an observability bus segment.

FIG. 5A depicts a coverage decode/capture circuit portion (or, simply coverage decoder) 500 which may be employed in conjunction with at least a section of the GPPC 200 of FIG. 2 or FIG. 3 according to one embodiment. In general, the coverage decode/capture circuit portion 500 provides functionality for efficiently decoding and capturing state coverage data generated when a logic design's state space, e.g., system state space 100 shown in FIG. 1, is exercised under a suite of test vectors. As may be appreciated by one skilled in the art, the logic design under test can be comprised of a large number of multi-bit state machines (e.g., counters, et cetera), and it would be advantageous to determine whether or not a particular test sequence has exercised (i.e., covered) all the states that a specific state machine can transition into. For instance, a counter of K bits can be represented as a state machine with $2^K$ states and the test vector sequence may be required to exercise all these states so that design corners of the functionality may be determined. Whereas mapping the occurrence of all such exercised states individually onto an observability bus may be feasible in applications with small state machine implementations, it can nevertheless be inefficient as well as unrealistic even in moderately complex designs. Accordingly, the present invention provides for encoding the state coverage information in a more compact way such that only a segment of the bus is utilized, which can be appropriately decoded for capturing the information as to whether or not a particular state has been exercised.

In one implementation, the encoded state coverage data may be mapped onto a portion of the debug_bus, e.g., a 7-bit segment, which can be selected by a selection circuit block comprising the sm_sel circuit 204 and the szero circuit 206 as part of a sum[7:0] signal as explained in the foregoing discussion. Reference numeral 502 refers to a 7-bit encoded state coverage signal provided as a subset of a sum[7:0] signal from the selection circuit block 204/206. A K-to-N line decoder 504 is operable to decode the encoded state coverage signal 502 into a plurality of one-hot signals (e.g., N one-hot signals) 506 wherein each one-hot signal is asserted (i.e., driven to a particular logic state, e.g., a logic high) only when a system state corresponding to the encoded signal is covered during a test sequence. It should be readily recognized that because of the generality and configurability of the debug_bus, a number of different coverage schemes can be easily implemented, for example, from a large number of states of the logic design that can be included for coverage in a test sequence to more focused location-specific structural or functional coverage of the design. Also, depending on the implementational objectives, either the entire width of the debug_bus or a portion thereof may be encoded for carrying the state coverage signals that can be decoded and captured for further analysis by the GPPC.

In the embodiment depicted in FIG. 5A, the 7-bit encoded state coverage signal 502 can be decoded into $2^7$ one-hot signals 506, each being indicative of whether or not a corresponding state has been exercised during test. A coverage capture block 508 is provided as part of circuitry 500 for determining which of the N one-hot signals are asserted over a period of time, thereby outputting a multi-bit capture output signal 510 for further analysis.

Figures 5B, 5C:
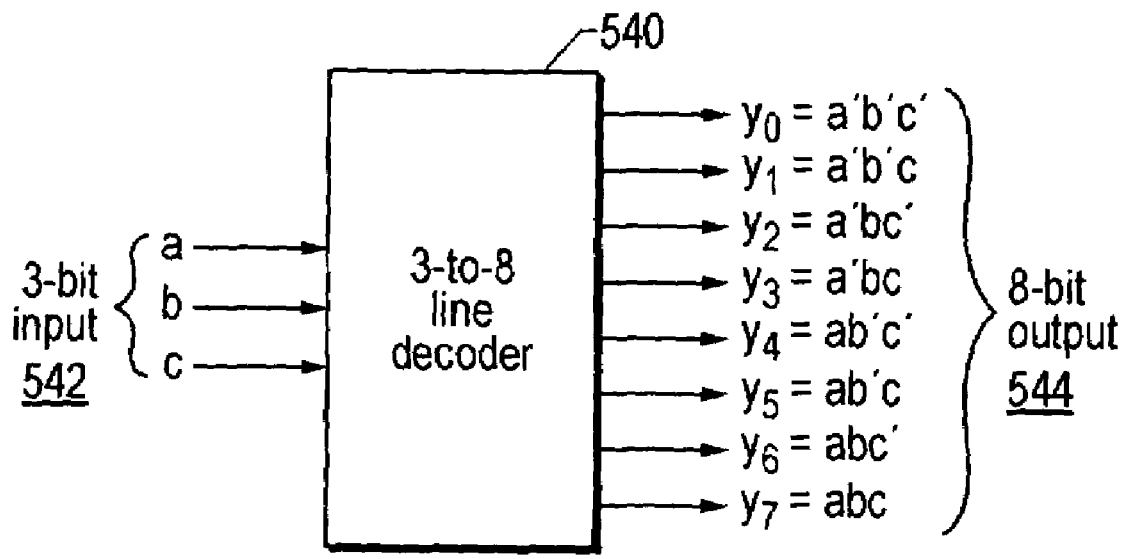
FIG. 5B depicts an example of a 3-to-8 line decoder for generating eight one-hot signals that can be decoded from three state coverage signals.
FIG. 5C is a truth table associated with the 3-to-8 line decoder shown in FIG. 5B.

The general operation of a K-to-N line decoder for generating N plurality of one-hot coverage signals based on a K-bit input may explained in reference to FIGS. 5B and 5C. A 3-to-8 line decoder 540 receives a 3-bit input 542 that comprises signals a, b and c. The decoder's functionality, which may be implemented using any combination of logic gates, is such that eight 8-bit output signals 544 are generated wherein each signal will be driven high at a particular bit location (i.e., one-hot) for any given logic combination of the three input signals, i.e., a, b and c signals. As shown in the truth table 546 of FIG. 5C, when each of the input signals is a binary 0 (a=b=c=0), the output 544 is [10000000]. When the input signal combination is such that a=0, b=0 and c=1, the line decoder 540 outputs the signal with the combination [01000000]. Accordingly, when a particular piece of the design under test is modeled as a 3-bit state machine, all the 8 states may be encoded into a 3-bit signal that is mapped onto a 3-bit bus segment coupled to the 3-to-8 decoder. By examining the output, one can determine whether a particular state has been covered or not during a test sequence. For instance, if the output 544 is [00000010], then the corresponding input must be [110], which implies that the state [110] of the state machine has been covered during test.

Figure 5D:
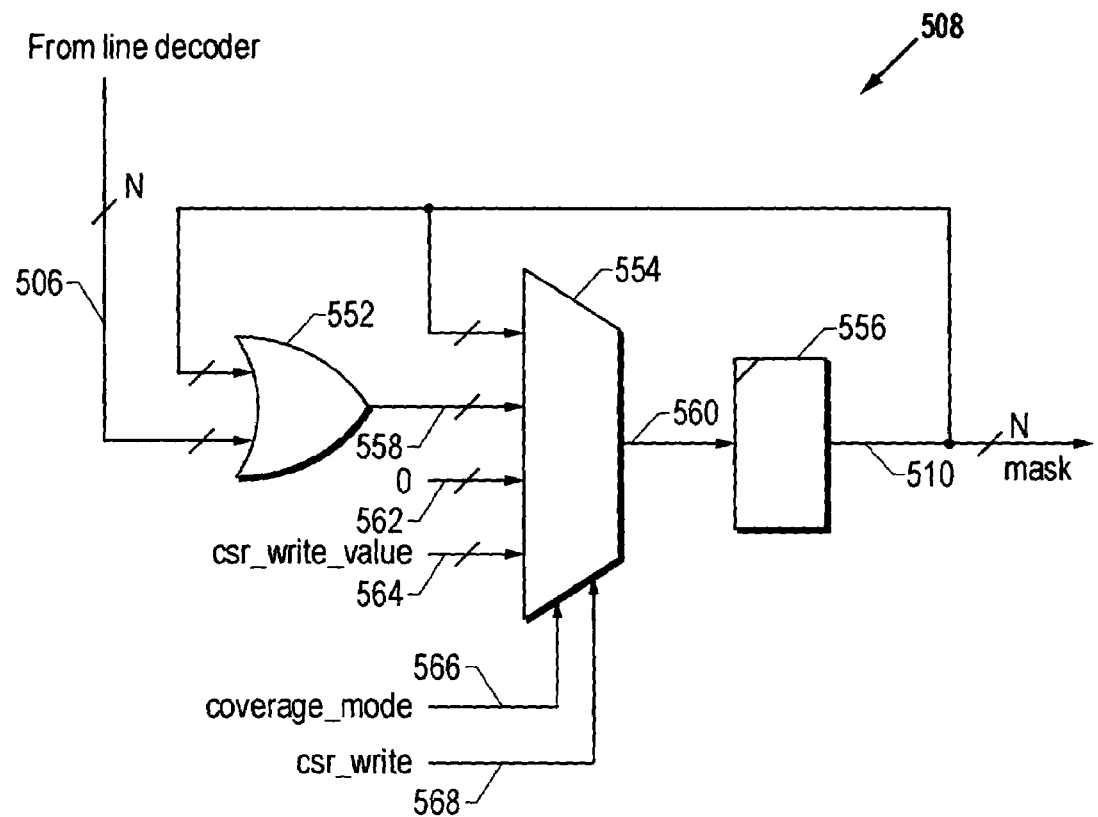
FIG. 5D depicts an embodiment of a capture circuit operable with a line decoder.

Referring now to FIG. 5D, an embodiment of the capture circuit block 508 is depicted therein in particular detail for capturing a plurality of one-hot coverage signals (e.g., N signals 506) generated by line decoder 504. First, the decoded one-hot signals 506 are provided to a logic structure 552 of the coverage capture circuit block 508 for performing a logic operation between the logic states of the one-hot signals and a multi-bit mask value (e.g., an N-bit mask) stored in a register block 556. The logic structure 552 may be implemented as an OR logic block that includes N 2-input OR gates for performing a bit-wise OR operation at any instance between the one-hot signals and the N-bit mask so as to generate an N-bit output 558. A Multiplexer (MUX) block 554 is coupled to the logic structure 552 for receiving the N-bit output as one the MUX inputs, which can be selected under control of at least one MUX control signal as a MUX output 560. As shown in FIG. 5D, the N-bit MUX output is operable to be stored into the register block 556, which can be read out as mask output 510 from the coverage decoder/capture block 500. Accordingly, when the N-bit output 558 from the OR logic structure 552 is selected as the MUX output 560, it is captured as the coverage data in the register block 556 that can be provided to another logic circuit, e.g., a GPPC circuit portion, for further analysis.

By way of implementation, the MUX block 554 includes N MUX elements, each operating responsive to two control signals, coverage_mode 566 and csr_write 568, for selecting among the following four MUX inputs on a bit-by-bit basis: N-bit output 558 from the logic structure 552, N-bit mask 510 stored in the register block 556, a value stored in a CSR (not shown) that is provided as N-bit csr_write_value 564, and a fixed binary 0 value 562. The following logic conditions of the two MUX control signals give rise to four modes of operation: (i) "All Zeros" mode when both coverage_mode and csr_write signals are logic 1 (which writes N binary 0's into the register block 556); (ii) "CSR Write" mode when coverage_mode signal is logic 0 and csr_write signal is logic 1 (which stores whatever value that the CSR contains into the register block 556); (iii) "Coverage" mode when coverage_mode signal is logic 1 and csr_write signal is logic 0 (which captures the one-hot coverage signals as the N-bit output 558 that is written to the register block 556); and (iv) "Re-write" or "Hold" mode when both coverage_mode and csr_write signals are logic 0 (which simply writes the mask value 510 back into the register block 556).

Figure 6:
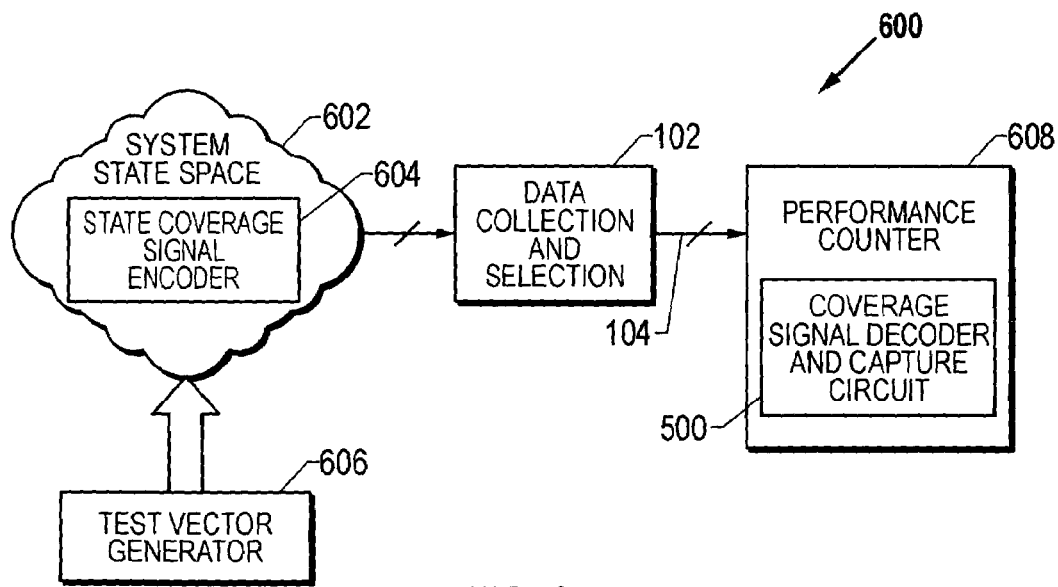
FIG. 6 depicts a block diagram of a system for obtaining and capturing encoded state coverage information in a logic design according to one embodiment.

Referring now to FIG. 6, depicted therein is a block diagram of an embodiment of a system 600 for obtaining and capturing encoded state coverage information in a logic design. Reference numeral 602 refers to a system state space associated with a logic design that includes a state coverage signal encoder 604 which operates to encode the states of a state machine that are exercised under test into a multi-bit state coverage signal. A test vector generator 606, which could be part of system software, is operable to provide a suite of test vectors (that may be configurable) for exercising the system state space 602 or a portion thereof in any number of ways. As pointed out earlier, the encoded state coverage signals are driven only when corresponding states or conditions in the logic design are covered under a particular test suite, whereupon the data collection and selection logic 102 is operable to collect the coverage signals via a suitably mapped portion of an event signal carried on the debug_bus 104. One or more performance counters, e.g., counter 608, are coupled to the debug_bus 104, wherein circuitry (such as the coverage decode/capture circuit 500 described above) is provided for decoding and capturing the coverage data emanating from the logic design.

Figure 7:
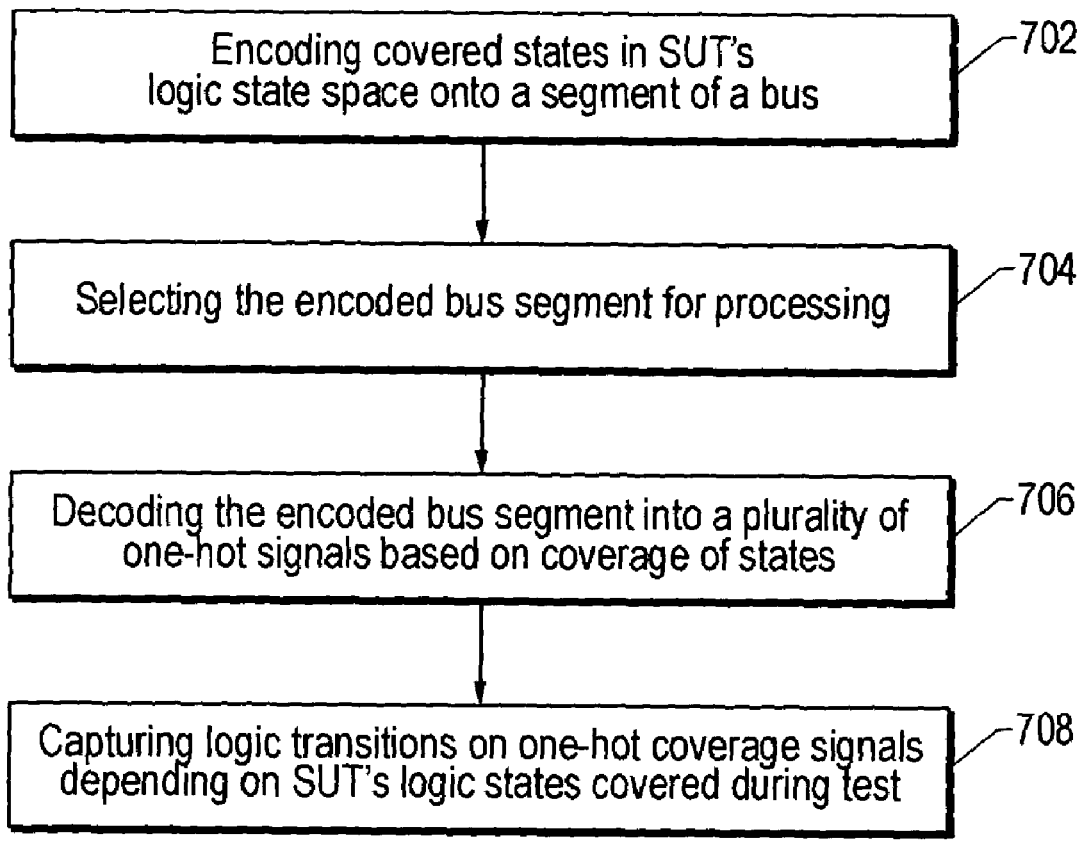
FIG. 7 depicts a flow chart of a test coverage method according to one embodiment.

FIG. 7 depicts a flow chart of an embodiment of a test coverage method that delineates these various operations in a concise manner. In block 702, a plurality of state coverage signals are encoded based on coverage of an SUT's logic state space. These encoded state coverage signals are appropriately mapped to be carried on an observability bus that may be coupled to a performance counter. A selection circuit therein is operable to select the bus segment carrying the encoded signals for processing by a decoder/capture circuit (block 704). A line decoder is provided for decoding the encoded bus segment into a plurality of one-hot signals based in coverage of the states of the state space (block 706). Any logic transitions that occur on the decoded one-hot coverage signals depending on SUT's logic states covered during test are captured using the capture circuitry as explained above (block 708).

Based on the foregoing Detailed Description, those skilled in the art should appreciate that the embodiments set forth herein provide a system that allows a large number of states to be observed in a simple hardware solution as the logic operations to be performed comprise only decoding and determining the occurrence of whether a coverage signal bit is set or not. Further, even a small bus segment can be encoded to continuously cover a large number of events in a state space (since $N=2^K$, where N=number of states observed and K=number of bits for encoding). Accordingly, the number of runs needed to observe events for state coverage information in a logic design can be reduced significantly.

Although the invention has been particularly described with reference to certain illustrations, it is to be understood that the forms of the invention shown and described are to be treated as exemplary embodiments only. Various changes, substitutions and modifications can be realized without departing from the spirit and scope of the invention as defined by the appended claims.

What is claimed is:

1. Circuitry for use with a general purpose performance counter ("GPPC") connected to a bus carrying a plurality of encoded state coverage signals indicative of test coverage in a logic design, said circuitry for decoding and capturing coverage information, comprising:
   a selection circuit operating to select said plurality of encoded state coverage signals from a multi-bit event signal carried on said bus;
   a line decoder operating to decode said plurality of encoded state coverage signals into N one-hot signals, wherein each one-hot signal is asserted when a corresponding state in said logic design is covered during a test; and
   a capture circuit coupled to said line decoder for capturing said N one-hot signals.

2. The circuitry as recited in claim 1, wherein said capture circuit comprises:
   an OR logic block for bit-wise ORing said N one-hot signals with an N-bit mask value stored in a register block, said OR logic block operating to generate an N-bit output; and
   a Multiplexer (MUX) block operating to select said N-bit output from said OR logic block under control of at least one control signal, wherein said N-bit output is operable to be stored into said register block when selected by said MUX block.

3. The circuitry as recited in claim 2, wherein said OR logic block comprises N 2-input OR gates.

4. The circuitry as recited in claim 2, wherein said MUX block comprises N MUX elements, each for selecting a particular bit of said N-bit output.

5. The circuitry as recited in claim 2, wherein said MUX block comprises N MUX elements, each operating responsive to two control signals for selecting among four MUX inputs, including a particular bit of said N-bit output.

6. The circuitry as recited in claim 5, wherein one of said MUX inputs comprises a value stored in a control status register (CSR).

7. The circuitry as recited in claim 5, wherein one of said MUX inputs comprises said mask value stored in said register block.

8. The circuitry as recited in claim 5, wherein one of said MUX inputs comprises a fixed binary 0 value.

9. The circuitry as recited in claim 1, wherein N is 80.

10. A method of capturing state coverage information in a logic design, comprising:
    encoding state coverage information generated when said logic design is exercised under test onto a segment of a bus connected to a general purpose performance counter ("GPPC");
    selecting said segment of said bus for processing;
    decoding said segment of said bus into N one-hot signals, wherein each one-hot signal is asserted when a corresponding state in said logic design has been covered during test;
    bit-wise ORing said N one-hot signals with an N-bit mask value stored in a register block for generating an N-bit output; and
    selecting said N-bit output by a Multiplexer (MUX) block operating under control of at least one control signal, wherein said N-bit output is operable to be stored into said register block when selected by said MUX block.

11. The method of capturing state coverage information in a logic design as recited in claim 10, wherein said bit-wise ORing operation is performed by an OR logic block comprising N 2-input OR gates.

12. The method of capturing state coverage information in a logic design as recited in claim 10, wherein said selecting of said N-bit output is performed by a MUX block comprising N MUX elements, each operating responsive to two control signals for selecting among four MUX inputs, including a particular bit of said N-bit output.

13. The method of capturing state coverage information in a logic design as recited in claim 12, wherein one of said MUX inputs comprises a value stored in a control status register (CSR).

14. The method of capturing state coverage information in a logic design as recited in claim 12, wherein one of said MUX inputs comprises said mask value stored in said register block.

15. The method of capturing state coverage information in a logic design as recited in claim 12, wherein one of said MUX inputs comprises a fixed binary 0 value.

16. The method of capturing state coverage information in a logic design as recited in claim 10, wherein N is 80.

17. A system for capturing state coverage information in a logic design, comprising:
    means for encoding state coverage information generated when said logic design is exercised under test onto a segment of bus connected to a general purpose performance counter ("GPPC");
    means for selecting said segment of said bus for processing;

means for decoding said segment of said bus into N one-hot signals, wherein each one-hot signal is asserted when a corresponding state in said logic design has been covered during test;

means for generating an N-bit output based on a logic operation between said N one-hot signals and an N-bit mask value stored in a register block; and a Multiplexer (MUX) block operating to select said N-bit output under control of at least one control signal, wherein said N-bit output is operable to be stored into said register block when selected by said MUX block.

18. The system for capturing state coverage information in a logic design as recited in claim 17, wherein said means for generating said N-bit output comprises an OR logic block that includes N 2-input OR gates for performing a bit-wise logic OR operation.

19. The system for capturing state coverage information in a logic design as recited in claim 17, wherein said MUX block comprises N MUX elements, each operating in response to two control signals for selecting among four MUX inputs, including a particular bit of said N-bit output.

20. The system for capturing state coverage information in a logic design as recited in claim 19, wherein one of said MUX inputs comprises a value stored in a control status register (CSR).

21. The system for capturing state coverage information in a logic design as recited in claim 19, wherein one of said MUX inputs comprises said mask value stored in said register block.

22. The system for capturing state coverage information in a logic design as recited in claim 19, wherein one of said MUX inputs comprises a fixed binary 0 value.

23. The system for capturing state coverage information in a logic design as recited in claim 17, wherein N is 80.

* * * * *